United States Patent
South et al.

(10) Patent No.: US 10,075,766 B2
(45) Date of Patent: *Sep. 11, 2018

(54) CONTENT UTILIZATION PARAMERIZATION

(71) Applicant: Spot Trender Inc., Mountain View, CA (US)

(72) Inventors: Christopher South, Mountain View, CA (US); Hiep L. Nguyen, Mountain View, CA (US)

(73) Assignee: Spot Trender Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/610,270

(22) Filed: May 31, 2017

(65) Prior Publication Data

US 2017/0264953 A1 Sep. 14, 2017

Related U.S. Application Data

(63) Continuation of application No. 14/932,964, filed on Nov. 4, 2015, now Pat. No. 9,681,185.

(60) Provisional application No. 62/075,113, filed on Nov. 4, 2014.

(51) Int. Cl.
  *H04H 60/06* (2008.01)
  *H04N 21/442* (2011.01)
  *G06Q 10/00* (2012.01)

(52) U.S. Cl.
  CPC ....... *H04N 21/44213* (2013.01); *G06Q 10/00* (2013.01); *H04N 21/44222* (2013.01)

(58) Field of Classification Search
  CPC combination set(s) only.
  See application file for complete search history.

(56) References Cited

U.S. PATENT DOCUMENTS

| 8,806,050 B2 * | 8/2014 | Chen ................ H04L 65/604 709/227 |
| 2005/0283395 A1 | 12/2005 | Lesandrini et al. |
| 2008/0247543 A1 | 10/2008 | Mick et al. |
| 2013/0235152 A1 * | 9/2013 | Hannuksela ..... H04N 19/00769 348/43 |
| 2014/0082645 A1 | 3/2014 | Stern et al. |
| 2014/0181851 A1 | 6/2014 | Givon et al. |

* cited by examiner

*Primary Examiner* — Kieu Oanh T Bui

(74) *Attorney, Agent, or Firm* — Ascenda Law Group, PC

(57) ABSTRACT

Feedback regarding a presentation may be received from viewers who have viewed the presentation. In some instances, the presentation may be segmented into a plurality of segments and one or more discrete segments included in the plurality may be divided into a plurality of sub-segments. The presentation may be provided to the plurality of viewers and feedback regarding a discrete sub-segment of the plurality of sub-segments may be received from each of the plurality of viewers via the feedback mechanism. A report based on the received feedback information may then be generated.

14 Claims, 8 Drawing Sheets

CONTENT UTILIZATION PARAMERIZATION

RELATED APPLICATIONS

This application is a CONTINUATION of U.S. patent application Ser. No. 14/932,964, filed Nov. 4, 2015, which is a NONPROVISIONAL of U.S. Provisional Patent Application No. 62/075,113, filed Nov. 4, 2014, both of which are hereby incorporated by reference in their entireties.

FIELD OF INVENTION

The present invention relates to the field of receiving feedback regarding a presentation from viewers who have viewed the presentation.

BACKGROUND

An area of ongoing research and development is in improving content usefulness. Content usefulness can be measured from at least two perspectives. From one perspective, a question can be posed regarding how useful content is to the content consumer. For example, one could consider whether the content is what the content consumer needs to make a decision. From another perspective, a question can be posed regarding how useful it is to a content owner when the content consumer consumes the content. For example, one could consider whether the content caused the content consumer to take an action that inured to the benefit of the content owner.

It is possible to detect actions surrounding content. For example, content can be ranked so as to show how much a content consumer "liked" the content. As another example, a system could detect whether an ad is clicked after a content consumer consumes content. Recognizing that making content more useful and receiving rankings of content can improve experiences of content consumers and/or content owners, it is desirable to improve the utility of content.

BRIEF DESCRIPTION OF THE DRAWINGS

The present application is illustrated by way of example, and not limitation, in the figures of the accompanying drawings, in which.

WRITTEN DESCRIPTION

Figure 1:
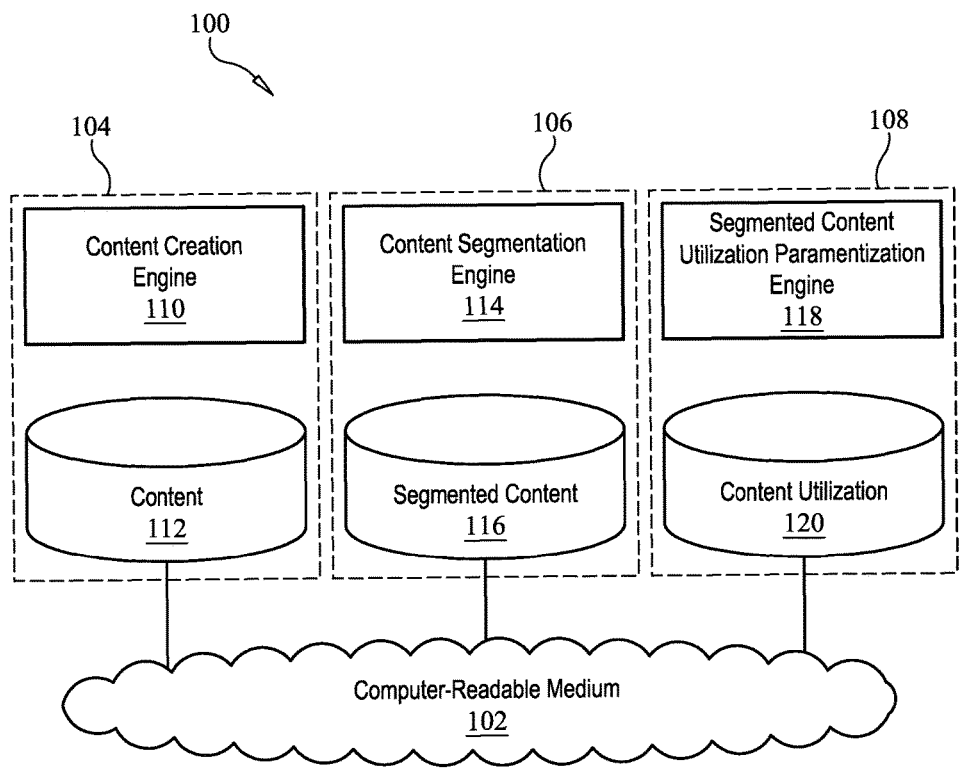
FIG. 1 depicts a diagram of an example of a system.

FIG. 1 depicts a diagram 100 of an example of a real-time response to content measuring system. The diagram 100 includes a computer-readable medium 102, a content server 104 coupled to the computer-readable medium 102, a content segmentation server 106 coupled to the computer-readable medium 102, and a segmented content utilization parameterization server 108 coupled to the computer-readable medium 102.

In the example of FIG. 1, the computer-readable medium 102 can include a networked system that includes several computer systems coupled together, such as the Internet, or a device for coupling components of a single computer, such as a bus. The term "Internet" as used herein refers to a network of networks that uses certain protocols, such as the TCP/IP protocol, and possibly other protocols such as the hypertext transfer protocol (HTTP) for hypertext markup language (HTML) documents that make up the World Wide Web (the web). Content is often provided by content servers, which are referred to as being "on" the Internet. A web server, which is one type of content server, is typically at least one computer system which operates as a server computer system and is configured to operate with the protocols of the web and is coupled to the Internet. The physical connections of the Internet and the protocols and communication procedures of the Internet and the web are well known to those of skill in the relevant art. For illustrative purposes, it is assumed the computer-readable medium 102 broadly includes, as understood from relevant context, anything from a minimalist coupling of the components illustrated in the example of FIG. 1, to every component of the Internet and networks coupled to the Internet.

A computer system, as used in this paper, is intended to be construed broadly. In general, a computer system will include a processor, memory, non-volatile storage, and an interface. A typical computer system will usually include at least a processor, memory, and a device (e.g., a bus) coupling the memory to the processor.

The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The term "computer-readable storage medium" is intended to include physical media, such as memory.

The bus can also couple the processor to the non-volatile storage. The nonvolatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable storage medium." A processor is considered to be "configured to execute a program" when at least one value associated with the program is stored in a register readable by the processor.

The bus can also couple the processor to the interface. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device.

In one example of operation, the computer system can be controlled by operating system software that includes a file management system, such as a disk operating system. File management systems are typically stored in non-volatile storage and cause the processor to execute the various acts required by the operating system to input and output data and to store data in the memory, including storing files on the non-volatile storage. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. Another example of operating system software with associated file management system software is VM (or VM/CMS), which refers to a family of IBM virtual machine operating systems used on IBM mainframes System/370, System/390, zSeries, System z, and compatible systems, including the Hercules emulator for personal computers.

Some portions of this paper may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not necessarily inherently related to any particular computer or other apparatus. Various general purpose systems may be used with programs to configure the general purpose systems in a specific manner in accordance with the teachings herein, or it may prove convenient to construct specialized apparatus to perform the methods of some embodiments. The required structure for a variety of these systems will appear from the description below. In addition, the techniques are not described with reference to any particular programming language, and various embodiments may thus be implemented using a variety of programming languages.

Referring once again to the example of FIG. 1, the content server 104 is coupled to the computer-readable medium 102. The content server 104 can be implemented on a known or convenient computer system. Only one content server is illustrated in FIG. 1, but it should be understood that specific implementations could have multiple content servers. Moreover, partial functionality might be provided by a first device and partial functionality might be provided by a second device, where together the first and second devices provide the full functionality attributed to the content server 104.

As used in this paper, a server is a physical computer (a computer hardware system) dedicated to run one or more services (as a host) to serve the needs of other computers on a network. Depending on the computing service that it offers it could be a database server, file server, mail server, print server, web server, gaming server, or some other kind of server. In the context of client-server architecture, as used in this paper, a server includes an engine that serves the requests of other engines, the "clients;" the "server" engine performs some computational task on behalf of "client" engines. The clients are connected to the server via the computer readable medium 102, either on the same computer or through a network.

An engine, as used in this paper, includes a dedicated or shared processor and, typically, firmware or software modules that are executed by the processor. Depending upon implementation specific or other considerations, an engine can be centralized or its functionality distributed. An engine can include special purpose hardware, firmware, or software embodied in a computer-readable medium for execution by the processor.

In the example of FIG. 1, the content server 104 includes a content creation engine 110 and a content datastore 112. As its name suggests, the content creation engine 110 creates content. The content can be created via multiple different operations (e.g., in parallel) and compiled, generated and modified in successive operations (e.g., in series), or some combination thereof. Depending upon context, content may refer to the content of a medium divorced from the medium itself "Media" and some compound words that include "media" (e.g. multimedia, hypermedia) often refer to a type of content. The distinction between medium and content is less clear when referring to interactive elements that contain information and are then contained in interactive media, such as GUI widgets contained in software. Due to the difficulty in forming a clear distinction in all cases between content and media, the term content is intended to mean either or both, depending upon the context in which the word is used. Thus, content can refer to the underlying content, layout, format, media, or a subset of these. The content creation engine 110 stores the content in the content datastore 112.

The content datastore 112 and other datastores described in this paper, can be implemented, for example, as software embodied in a physical computer-readable medium on a general- or specific purpose machine, in firmware, in hardware, in a combination thereof, or in an applicable known or convenient device or system. Datastores described in this paper are intended, if applicable, to include any organization of data, including tables, comma-separated values (CSV) files, traditional databases (e.g., SQL), or other known or convenient organizational formats.

In an example of a system where the content datastore 112 is implemented as a database, a database management system (DBMS) can be used to manage the content datastore 112. In such a case, the DBMS may be thought of as part of the content datastore 112 or as part of the content server 104, or as a separate functional unit (not shown). A DBMS is typically implemented as an engine that controls organization, storage, management, and retrieval of data in a database. DBMSs frequently provide the ability to query, backup and replicate, enforce rules, provide security, do computation, perform change and access logging, and automate optimization. Examples of DBMSs include Alpha Five, DataEase, Oracle database, IBM DB2, Adaptive Server Enterprise, FileMaker, Firebird, Ingres, Informix, Mark Logic, Microsoft Access, InterSystems Cache, Microsoft SQL Server, Microsoft Visual FoxPro, MonetDB, MySQL, PostgreSQL, Progress, SQLite, Teradata, CSQL, OpenLink Virtuoso, Daffodil DB, and OpenOffice.org Base, to name several.

Database servers can store databases, as well as the DBMS and related engines. Any of the datastores described in this paper could presumably be implemented as database servers. It should be noted that there are two logical views of data in a database, the logical (external) view and the physical (internal) view. In this paper, the logical view is generally assumed to be data found in a report, while the physical view is the data stored in a physical storage medium and available to a specifically programmed processor. With most DBMS implementations, there is one physical view and an almost unlimited number of logical views for the same data.

A DBMS typically includes a modeling language, data structure, database query language, and transaction mechanism. The modeling language is used to define the schema of each database in the DBMS, according to the database model, which may include a hierarchical model, network model, relational model, object model, or some other applicable known or convenient organization. An optimal structure may vary depending upon application requirements (e.g., speed, reliability, maintainability, scalability, and cost). One of the more common models in use today is the ad hoc model embedded in SQL. Data structures can include fields, records, files, objects, and any other applicable known or convenient structures for storing data. A database query language can enable users to query databases, and can include report writers and security mechanisms to prevent unauthorized access. A database transaction mechanism ideally ensures data integrity, even during concurrent user accesses, with fault tolerance. DBMSs can also include a metadata repository; metadata is data that describes other data.

Referring once again to the example of FIG. 1, the content segmentation server 106 is coupled to the computer-readable medium 102. The content segmentation server 106 can be implemented on a known or convenient computer system. Only one content segmentation server is illustrated in FIG. 1, but it should be understood that specific implementations could have multiple content servers. Moreover, partial functionality might be provided by a first device and partial functionality might be provided by a second device, where together the first and second devices provide the full functionality attributed to the content segmentation server 106. Conceptually, logically, or physically, the content segmentation server 106 and the content server 104 can be combined to form a content creation and segmentation server that facilitates the creation of segmented content.

In the example of FIG. 1, the content segmentation server 106 includes a content segmentation engine 114 and a segmented content datastore 116. The content segmentation engine 114 can segment content from the content datastore 112 using rules and/or input from a user. Segmentation is described later in greater detail. The results of the segmentation process are stored as segmented content in the segmented content datastore 116.

Referring once again to the example of FIG. 1, the segmented content utilization parameterization server 108 is coupled to the computer-readable medium 102. The segmented content utilization parameterization server 108 can be implemented on a known or convenient computer system. Only one segmented content utilization parameterization server is illustrated in FIG. 1, but it should be understood that specific implementations could have multiple servers. Moreover, partial functionality might be provided by a first device and partial functionality might be provided by a second device, where together the first and second devices provide the full functionality attributed to the segmented content utilization parameterization server 108. Conceptually, logically, or physically, the segmented content utilization parameterization server 108 and the content segmentation server 106 can be combined to form a content segmentation and utilization parameterization server that facilitates segmenting content and obtaining utilization parameters therefor.

In the example of FIG. 1, the segmented content utilization parameterization server 108 includes a segmented content utilization parameterization engine 118 and a content utilization datastore 120. The segmented content utilization parameterization engine 118 can obtain utilization feedback associated with consumption of the segmented content by content consumers for providing to content presenters to facilitate a better understanding of or information useful for determining how to change the content. Mechanisms for obtaining the feedback and providing useful information are described later in greater detail. The useful information is stored in the content utilization datastore 120.

Figure 2:
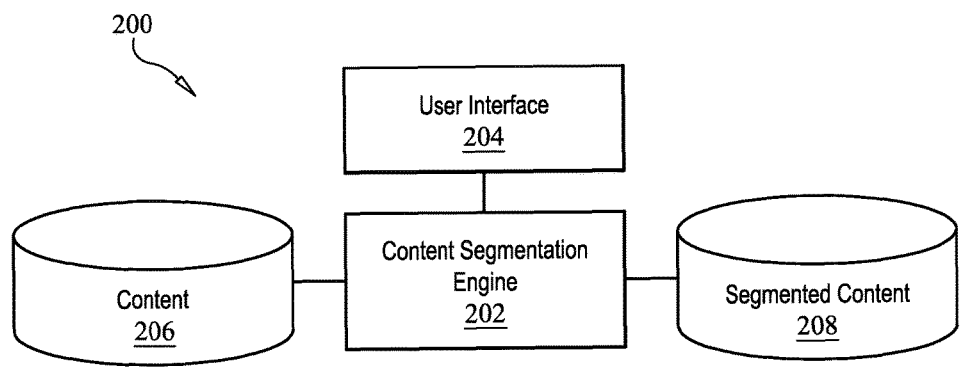
FIG. 2 depicts a diagram of an example of a content segmentation server.

FIG. 2 depicts a diagram 200 of an example of a content segmentation server. The diagram 200 includes a content segmentation engine 202, a user interface 204 coupled to the content segmentation engine 202, a content datastore 206 coupled to the content segmentation engine 202, and a segmented content datastore 208 coupled to the content segmentation engine 202.

In the example of FIG. 2, in operation, the content segmentation engine 202 receives instructions from a user over the user interface 204. The content segmentation engine 204 can also display content or other information to the user over the user interface 204. The user interface 204 can include applicable technology, such as a network interface, browser, drivers, and other components that enable a user to utilize the content segmentation engine 204. Depending upon the implementation, the user interface 204 could be considered optional because the content segmentation engine 202 could operate using stored rules. However, it is expected that users will often wish to provide input regarding the segmentation process, particularly after received feedback, if any, from consumers of the segmented content.

In the example of FIG. 2, in operation, the content datastore 206 includes content that can be converted into segmented content. The content can be of an applicable content type that can depend on implementation-specific factors. Depending upon the implementation, the content can be configured for use in a specific medium (e.g., multimedia, POWERPOINT® slide, etc.). If the content is stored in a "generic" format, the content segmentation engine 202 will likely include a conversion engine for converting from the generic format to a standard, proprietary, or other format. It may be desirable in any case for the content segmentation engine 202 to have some conversion capabilities, regardless of the format of the stored content, because that reduces media-specific limitations.

In the example of FIG. 2, in operation, the segmented content datastore 208 includes content that has identifiable segments. Segmented content has a specific data structure that comprises multiple content segments with segment identifiers. The segment identifiers facilitate tracking of utilization with respect to the specific segments. In a specific implementation, the segmented content includes multiple content segments of video content, such as an mpeg. In this specific implementation, the mpeg will have a duration that can be measured, but the mpeg is not broken into discrete time units. During transmission, the mpeg is also typically broken into packets (also referred to using other terminology, such as "datagram" depending upon the transmission technology, OSI layer, or other factors), but the mpeg will not typically be broken into packets until the relevant stimulus (e.g., transmission over a wireless link) come into play. Thus, the mpeg is treated as a discrete unit of variable size. The segmented content includes additional information, such as metadata that identifies segments of the mpeg that correspond to specific segments. The metadata can make use of the duration of the mpeg, or more specifically the timeline, to identify relevant segments. In a specific implementation, the segments are of variable size.

Figure 3:
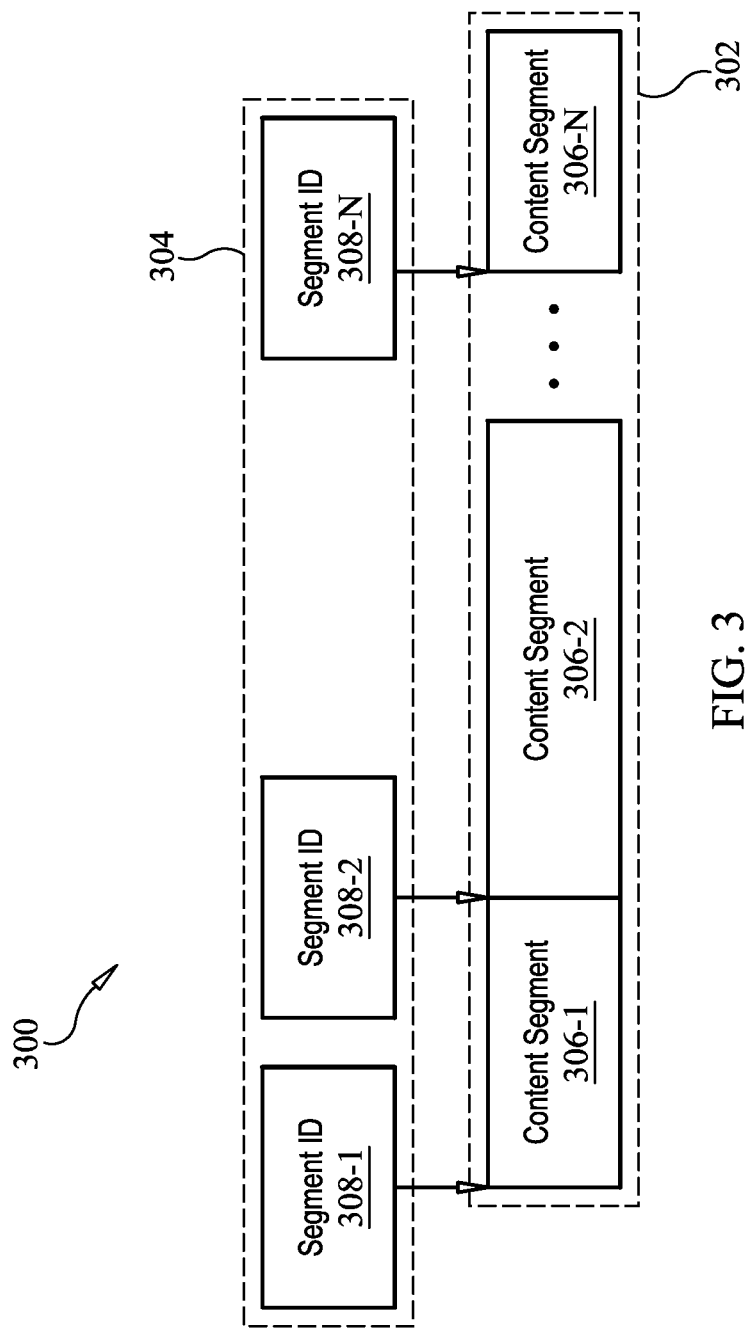
FIG. 3 depicts a diagram of an example of a segmented content data structure.

FIG. 3 depicts a diagram 300 of an example of a segmented content data structure. The diagram 300 includes a segmented content substructure 302 and a metadata substructure 304. In the example of FIG. 3, the segmented content substructure 302 includes content segments 306-1 to 306-N (referred to collectively as "content segments 306"). The different sizes of the content segments 306 in the example of FIG. 3 is intended to illustrate that the content segments can be of non-uniform size. The actual size of the content segments 306 can be affected by a user providing input regarding the segmentation process, rules used by a content segmentation engine, or other factors. The size of the content segments 306 may or may not be limited to a predefined range. In an implementation that does not include a predefined range, the smallest size can be limited by practicality or the smallest meaningful unit of measure available and the largest size can be bound by the size of the content. In a specific implementation, the segmented content substructure 302 includes a data structure that is unsegmented, and the metadata of the metadata substructure 304 can be used to identify the segmentation. (In this specific implementation, converting content to segmented content can be accomplished without actually modifying the content.)

In the example of FIG. 3, the metadata substructure 304 includes segment identifiers (IDs) 308-1 to 308-N (referred to collectively as "segment IDs 308"). In the example of FIG. 3, the segment IDs 308 correspond to the beginning of respective ones of the content segments 306. In an alternative, the segment IDs 308 could instead or in addition correspond to the ends of respective ones of the content segments 306. The metadata substructure 304 can include other metadata, as well, but a minimalist metadata substructure 304 would likely include only the segment IDs 308 and media- or technologyspecific metadata (standards-based or proprietary), if any.

Referring once again to the example of FIG. 2, in operation, the content segmentation engine 202 converts content in the content datastore 206 into segmented content that is stored in the segmented content datastore 208. The datastores need not be physically distinct, and content that is partially segmented or metadata about the ultimate content segmentation, can be considered part of either datastore, but is treated as part of the segmented content datastore 208 for illustrative purposes; data that is stored in association with the segmentation of content is treated as part of the segmented content datastore 208 in this paper.

Figure 4:
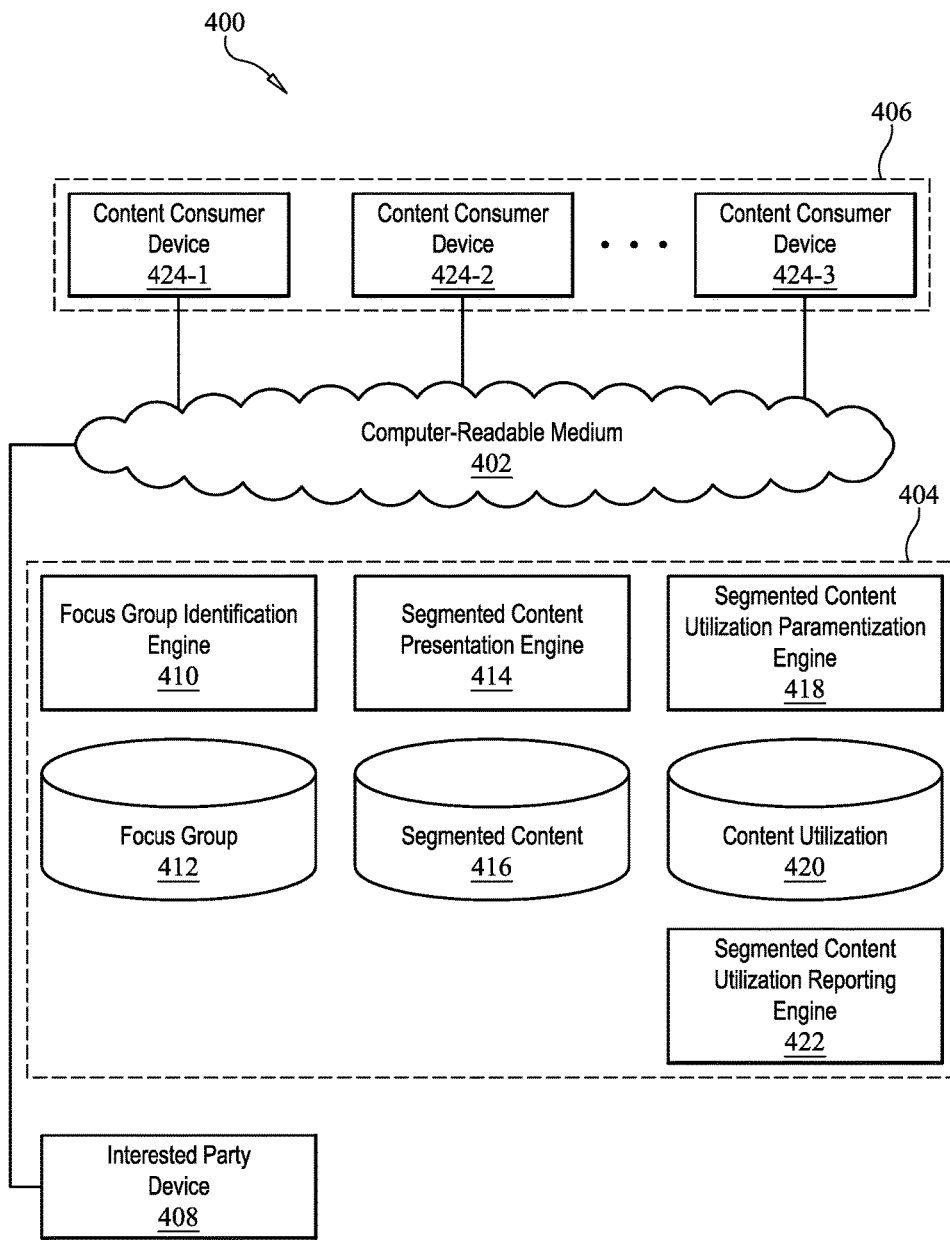
FIG. 4 depicts a diagram of an example of a segmented content utilization parameterization system.

FIG. 4 depicts a diagram 400 of an example of a segmented content utilization parameterization system. The diagram 400 includes a computer readable medium 402, a segmented content utilization parameterization server 404 coupled to the computer readable medium 402, segmented content consumer clients 406 coupled to the computer readable medium 402, and an interested party device 408 coupled to the computer readable medium 402. In the example of FIG. 4, the computer readable medium 402 is of a size that varies by implementation, but is likely to be between LAN-sized and WAN sized (e.g., the Internet and/or a public switched telephone network (PSTN)).

In the example of FIG. 4, the segmented content utilization parameterization server 404 includes a focus group identification engine 410, a focus group datastore 412, a segmented content presentation engine 414, a segmented content datastore 416, a segmented content utilization parameterization engine 418, a content utilization datastore 420, and a segmented content utilization reporting engine 422.

The focus group identification engine 410 can use the focus group datastore 412 to identify a first focus group for first segmented content. Alternatively or in addition, the focus group identification engine 410 can invite an identifiable group of users to participate. The invitation can be sent via a channel different from the channel by which the segmented content is ultimately presented (e.g., the invitation could be sent via an email service and the segmented content could be presented in a web page). The term "focus group" is not intended to limit participation; the term is intended to be applied broadly. For example, in the context of human resources, the "focus group" could be potential employers who receive segmented content associated with a candidate. As other examples, the focus group could include potential investors in businesses associated with segmented content, potential purchasers of products associated with segmented content, potential social matches with people associated with segmented content, to name several. An invitation can include additional materials, such as a prompt to fill out a profile necessary for participation, a prompt to sign a non-disclosure agreement (NDA) or other contract, to name a couple. The contents of the invitation and the requirements for participation, if any, can depend upon the implementation and/or configuration (e.g., as required by the content creator, segmented content presenter, etc.). In a specific implementation, the invitation is provided in the form of a quick response (QR) code, which can act as a guide to a display of relevant segmented content. The QR code can be printed on a business card or other physical material. The invitation could also be provided using a shortrange technology to a nearby person's mobile device. Advantageously, the focus group identification engine 410 can facilitate crowdsourcing of funding, investment, recruiting, market validation, and other activities.

The segmented content presentation engine 414 can provide first segmented content in the segmented content engine 416 to a first focus group identified by the focus group identification engine 410. The first segmented content can be presented on demand to any member of the first focus group, within constraints that vary by implementation and/or configuration (e.g., within a predetermined time period for all participants, within a period of time from receipt of the invitation, until the first segmented content is outdated (potentially including replacing the first segmented content with new content), depending upon the parameters of the invitation, depending upon the state of completion of a participant's profile, etc.). Alternatively, the first segmented content can be presented at a specific time, requiring participants to "tune in" at the appropriate time.

In a specific implementation, the segmented content presentation engine 414 presents the first segmented content with a feedback mechanism. The feedback mechanism can have an appearance 22 that varies depending upon the implementation, but in any case provides content utilization feedback that can be applied to a specific segment of the first segmented content. For example, a slider can be presented with a video. Content consumers can adjust the slider depending upon how much they like the content at any given time. Meaning of the word "like" can vary depending upon the context (e.g., in an educational context, "like" can mean the content consumer feels like they are learning something). In a specific implementation, the feedback mechanism includes sensors to detect facial expressions (e.g., using facial recognition technology), verbal cues (e.g., using voice analysis), physical treatment of a mobile device (e.g., pressure, movement, etc.). The segmented content utilization parameterization engine 418 receives data associated with utilization of the first segmented content for storage in the content utilization datastore 420. Content utilization parameterization can include consideration of feedback associated with the feedback mechanism. The feedback can be explicitly identified in association with a segment or the segmented content utilization parameterization engine 418 can use data contained within feedback to identify the relevant segment to which the feedback should be associated (e.g., a rating associated with a particular time in a video clip can be applied to a segment that is known to last from before the particular time to after the particular time). Because the feedback mechanism is timevarying, it may be desirable to correct for time it takes to process new data (e.g., consider a first segment 23 associated with a high rating and a second segment immediately following the first segment associated with a low rating; for a period of time after the first segment ends, the feedback could be "high" until a content consumer decides the second segment is not as good, whatever that means in the given context).

The segmented content utilization reporting engine 422 creates reports from data in the content utilization datastore 420. The reports are intended to give an interested third party information about content utilization. Because utilization data can be sufficiently discrete to provide information about specific segments of content, the reports can enable the interested third party to decide whether to change the relevant segments in a manner responsive to the data. For example, an interested third party might be motivated to change a segment to make it more appealing to a specific demographic determinable from a focus group providing feedback about the content. The interested party, as used in this paper, is a person or legal entity with an interest in understanding how appealing first segmented content is to a subset of consumers of the content. The interested party may or may not be a content creator and/or a segmented content creator.

In the example of FIG. 4, the segmented content consumer clients 406 include content consumer devices 424-1 to 424-N (collectively referred to as the content consumer devices 424). In a specific implementation, the content consumer devices 424 are used to play first segmented content 24 and input feedback associated with the first segmented content in a manner that enables the feedback to be discretely associated with specific ones of the segments of the first segmented content. A content consumer may or may not receive an invitation, if any, on the same device that is used to play the first segmented content. (E.g., the invitation could be received on a first device and the segmented content played on a different device.) Because the device "plays" the first segmented content, the device can be referred to as a "playback device." Some content (or the media in which the content is presented) may have a different verb associated with its playback. For example, still pictures, such as jpegs, might be referred to as "viewed" instead of played. Slides might be referred to as "showed" instead of played. For convenience, the verb "to play" is intend to cover the use of any of these verbs in this paper.

In a specific implementation, content consumer devices 424 do not play the first segmented content. Rather, the first segmented content is played by another device and the content consumer devices 424 are used for the sole purpose of providing feedback that can be discretely associated with specific ones of the segments of the first segmented content. For example, the first segmented content could be presented on a screen that is visible to an audience. One or more of the audience members can use one or more of the content consumer devices 424 to provide feedback regarding the first segmented content that is played for the audience. In an alternative, the first segmented content can 25 be a live-action (or otherwise unsegmented) presentation that is segmented after the fact. (In this alternative, the system of the example of FIG. 4 could include a presented content segmentation engine, not shown.)

In the example of FIG. 4, the interested party device 408 can receive segmented content utilization reports from the segmented content utilization reporting engine 422. An associated interested party can use the interested party device 408 (or some other device) to modify one or more segments of the segmented content that was played by or for the applicable focus group. Such modification can be made by a content segmentation engine (see, e.g., FIG. 2) or a segmented content editing engine (not shown).

Figure 5:
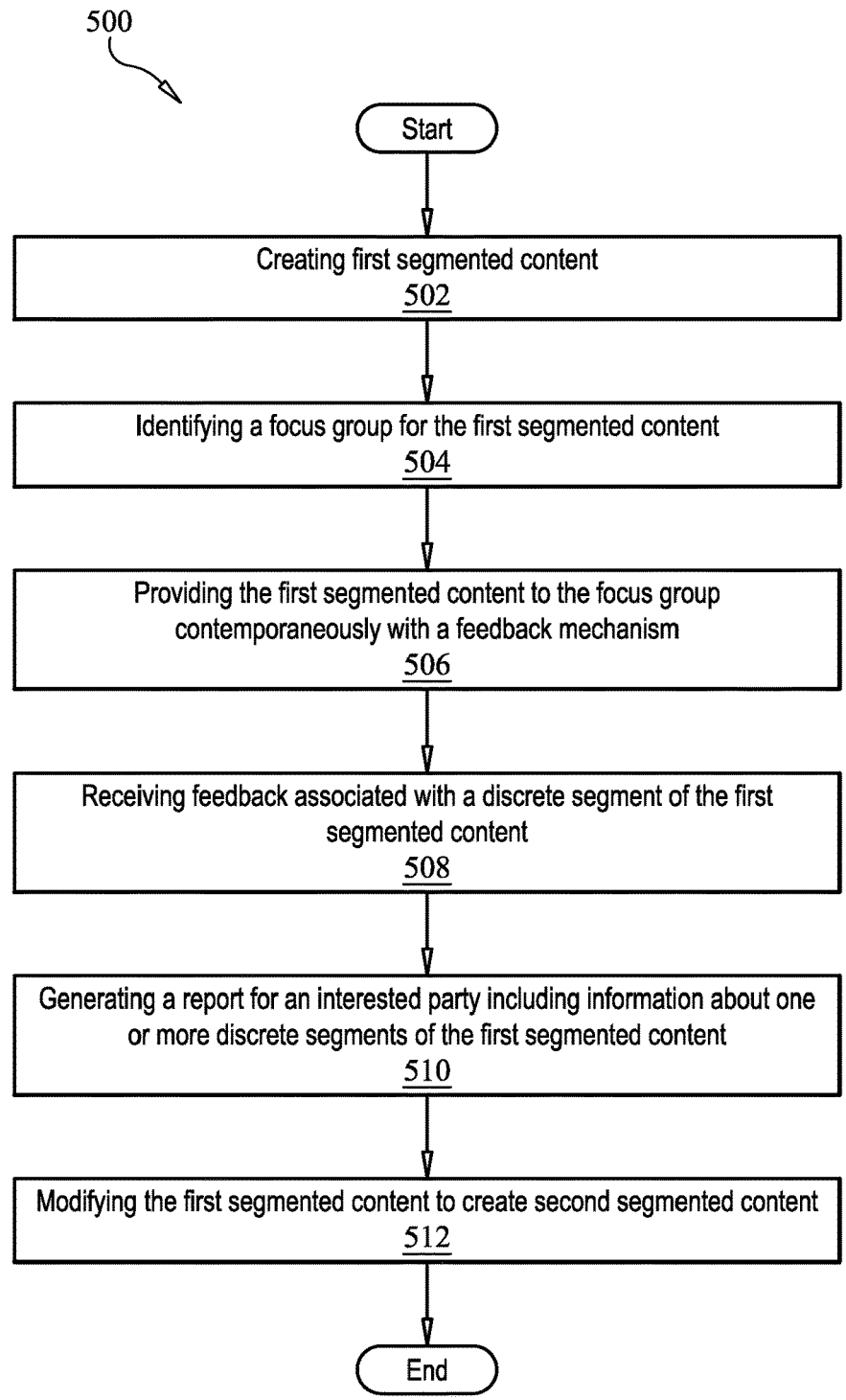
FIG. 5 depicts a flowchart of an example of a method for segmented content utilization.

FIG. 5 depicts a flowchart 500 of an example of a method for segmented content utilization. The flowchart 500 is presented as a series of discrete modules. Alternative flowcharts can change the order of the modules or reorder the modules for parallel execution, if applicable. In the example of FIG. 5, the flowchart 500 starts at module 502 with creating first segmented content. Segmented content can be created by, at a minimum, defining a starting and ending point for each of a plurality of segments of content. Identifying a starting point for each segment is generally sufficient to implicitly define a starting and ending point for each of the plurality of segments of content. Similarly, identifying an ending point for each segment is generally sufficient to implicitly define a starting and ending point 26 for each of the plurality of segments of content. In an implementation that includes "dead space" that is not treated as a segment, it may be desirable to explicitly define both starting and ending points for each relevant segment. Because the start and end of content is often known, it may be desirable to identify breaks between segments, as opposed to starting points for each segment (because the starting point of the first segment in an implementation that includes no dead space will be the start of the content) or end points for each segment (because the ending point of the last segment in an implementation that includes no dead space will be the end of the content), which will generally include one less segment break data point than either start data points in an implementation that identifies the start of each segment or end data points in an implementation that identifies the end of each segment. In a specific implementation, segmenting content involves creating metadata, as opposed to chunking segments of content into discrete, e.g., files.

In the example of FIG. 5, the flowchart 500 continues to module 504 with identifying a focus group for the first segmented content. The focus group can be identified by identifying records or other data structures in a datastore that match a certain criteria (e.g., accounts with profiles that match a specific demographic). The focus group can be identified by sending invitations to those on a focus group list that may or may not be formed by matching records in a datastore with a criteria. The focus 27 group can be identified over time using responses from invitees. The responses may or may not include data that can be matched to specific criteria; when no such data is included, the response itself can be used as an identification of a focus group participant. Depending on the implementation, the first segmented content may or may not be identified or even identifiable when a focus group is identified or when invitations are sent. Of course, it will be desirable to have the content both identified and available when a participant expects he or she should be able to play the content (e.g., by clicking on a hyperlink).

In the example of FIG. 5, the flowchart 500 continues to module 506 with providing the first segmented content to the focus group contemporaneously with a feedback mechanism. The feedback mechanism may or may not be provided on a same device as the first segmented content is played. For example, the feedback mechanism could be presented on a mobile device of a person who is viewing the first segmented content on a movie screen. Feedback entered in accordance with the characteristics of the feedback mechanism can be timestamped or otherwise timed to match the feedback to discrete segments of the first segmented content as it is presented. Feedback can be measured using an applicable sensor. In a specific implementation, the feedback mechanism is a slider that can be adjusted during the presentation of the first segmented content to indicate greater or 28 lesser approval of the first segmented content. A two-dimensional slider (e.g., with a vertical and horizontal component) can be used to capture approval that consists of more than one metric (e.g., aesthetic and informational approval). While a desirable feature of the feedback mechanism is ease of use, it is theoretically possible to include any practical number of sliders or input devices that correspond to different aspects of approval.

In a specific implementation, the first segmented content is presented one segment at a time with breaks between the segments. For example, a first segment can play for a time and viewers of the first segment can be prompted to provide feedback when the first segment ends. When the feedback is received, a second segment can play for a time and viewers of the second segment can be prompted to provide feedback when the second segment ends. It may be desirable to present the first segmented content in its entirety, without breaks for providing feedback, either before the content is presented in its discrete segments, or after the content is presented in discrete segments.

In the example of FIG. 5, the flowchart 500 continues to module 508 with receiving feedback associated with a discrete segment of the first segmented content. The feedback mechanism may or may not include an awareness of the segments of the first segmented content. For example, the feedback mechanism can timestamp input and send the timestamped feedback to a server for application to a discrete segment without the device on which the feedback mechanism is presented 29 ever receiving segment IDs. When the first segmented content is presented in discrete segments, feedback can be applied to the just-presented segment.

In the example of FIG. 5, the flowchart 500 continues to module 510 with generating a report for an interested party including information about one or more discrete segments of the first segmented content. The report enables the interested party to determine an impact of the first segmented content on the relevant focus group. To the extent demographic data is known for participants in the focus group, the report can show impact by demographic. In the example of FIG. 5, the flowchart 500 continues to module 512 with modifying the first segmented content to create second segmented content. Advantageously, the interested party can target specific discrete segments of the first segmented content for improvement in response to the feedback that is associated with the specific discrete segments. The second segmented content can then be presented to the same or a different focus group as described previously, or presented publicly or to groups matching a relevant (e.g., demographic) criteria if the interested party is satisfied with the results. For example, a segmented video resume could be presented to a number of employers and improved using feedback from the employers, then presented to other employers. An individual who is looking for two jobs might have two different resumes, and only employers matching the appropriate criteria would see the relevant resume (e.g., a person could have an acting 30 CV and a computer programmer CV, and employers would be presented with one or the other, but not both). It is possible to use both a first segmented content and a second segmented content, where some of the segments are identical and some of the segments are more attuned to consumers of the content with relevant criteria.

The present invention provides users with the ability to obtain information regarding a viewer's reaction to a video and/or audio/video presentation for a plurality of viewers. In some instances the plurality of viewer may be organized based on one or more characteristics (e.g., age, gender, annual income, etc.).

In general a presentation is provided to a viewer and that viewer provides feedback regarding the presentation at various points in the presentation. A portion of the presentation played between the points in the presentation may be referred to a segment as explained above. Viewer feedback regarding a presentation, or a segment thereof, may be obtained in any appropriate manner including, but not limited to a binary like or don't like decision, a rating on a scale (e.g., 1-5 or 1-10), or a behavioral response (e.g., looking away from the screen, time spent looking only the screen providing the presentation to the viewer, whether the viewer fast forwarded or rewound a segment of the presentation, etc.).

Once the information is obtained, it may be analyzed and provided to a user and/or producer of the presentation in a number of ways as will be discussed in detail below. Initially, an overview of the viewers' reactions to the presentation and/or a segment thereof may be presented on, for example, an interactive dashboard provided by a display or computer monitor. The overview may provide information regarding, for example, how many viewers watched the presentation, information about viewer characteristics, an overview of viewer reaction to the presentation or a segment thereof, etc.

A user may be provided with various analytical and/or statistical information regarding viewer response to the presentation in the form of, for example, a graph or table. For example, a user may be provided with a window by which to view the 31 presentation at issue, information regarding viewer reactions to the presentation, how many viewers viewed the presentation, attention span of viewers when viewing the presentation, etc.

The viewer information may be subjected to various filters and other statistical means of analyzing and/or filtering the information. The viewer information may be presented to a user via a reaction graph of positive and negative feedback as a function of time, or segment. It will be understood by those of skill in the art that the intervals for the time scale may be of any appropriate duration including, but not limited to, seconds, minutes, hours, etc.

Figure 6:
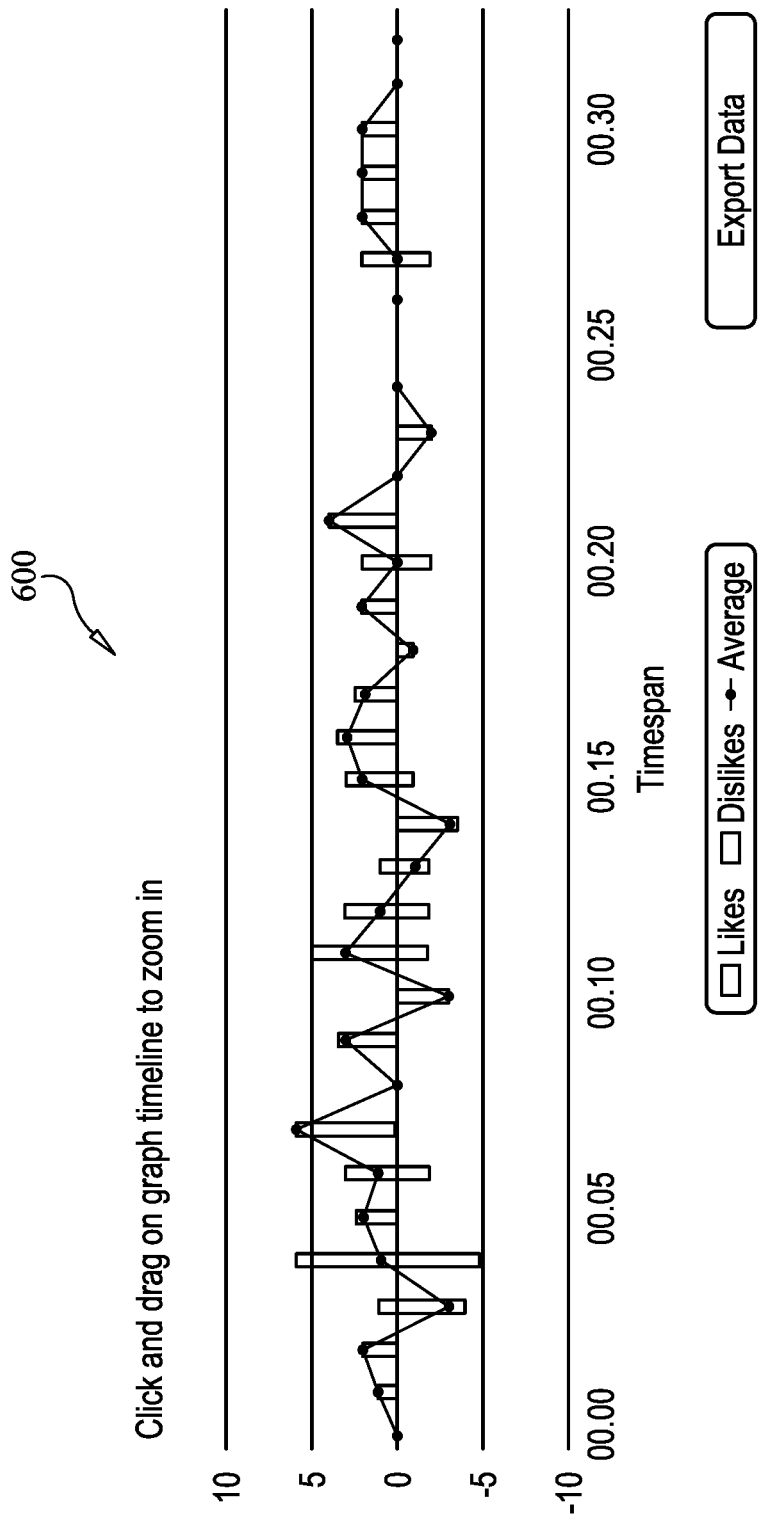
FIGS. 6, 7A-7B and 8 show reaction graphs.

An example of a reaction graph 600 is provided in FIG. 6, which illustrates like and dislike for a presentation as a function of time. In reaction graph 600, values above the 0 x-axis represent likes, values below the 0 x-axis represent dislikes and the white square and line that connects the white squares represent the average, or mean, number of likes vs. dislikes.

Reaction graph 600 may also be used to determine the number of reactions, or feedback instances, that occur for a particular segment of the presentation. For example, the largest number of feedback instances occur at 00.04 seconds and the smallest number of feedback instances occur at 00:24, 00:25, and 00:26 time. This information may be used to determine viewer engagement with the presentation and how much attention they were paying to the presentation.

On some occasions, viewer information may include information may include viewer comments about a segment and/or the presentation as a whole. In some embodiments, this information may be accessed by focusing in, or otherwise selecting a portion of reaction graph 600. In this way, a user may interact directly with the reaction graph 600 so as to determine one or more factors that may contribute to a quantity of like and/or dislikes.

In some embodiments, definition and/or selection of video segments may be user configurable. A user may define a segment, or a plurality of segments, before, during, and/or after viewer information is gathered. For example, a user may define a segment according to duration (e.g., segments defined by a time period like 5 seconds, 15 seconds, etc.), correlation to a storyline of the presentation (e.g., introduction, conclusion, 32 display of a logo, introduction of a concept, etc.), correlation to a different presentation, and so on.

In some embodiments, a user may define a segment while watching the presentation and marking the presentation in some way. For example, a user may start and stop play of the presentation and define the portion of the presentation that occurs between the start and stop of play as a segment. Segments may be separate from one another on the timeline or may over lap, either partially or totally on the timeline. A user may also adjust the portions of the presentation selected via stopping and starting play the presentation by, for example, manually adjusting one or more times that define the segment. To facilitate differentiation between segments, a user may be able to assign a name or other identifier to a defined segment.

In one embodiment, a user may define a segment by selecting a time period from the timeline of a reaction graph, such as reaction graph 600. For example, a user may want to select a portion of a reaction graph that corresponds to a lot of likes as a first segment, a portion of the reaction graph that corresponds to a lot of dislikes as a second segment, and so on.

Figure 7A:
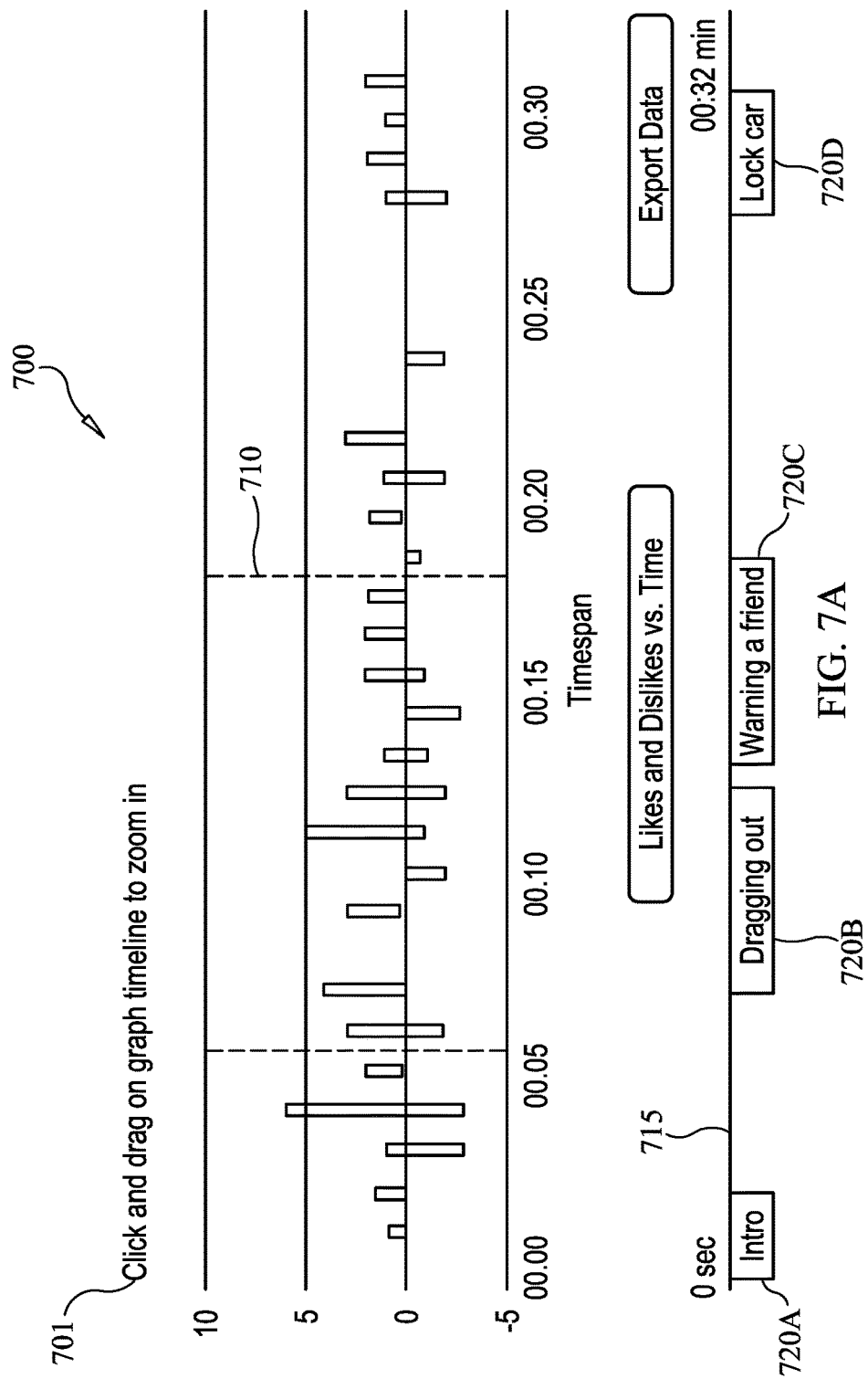
Figure 7B:
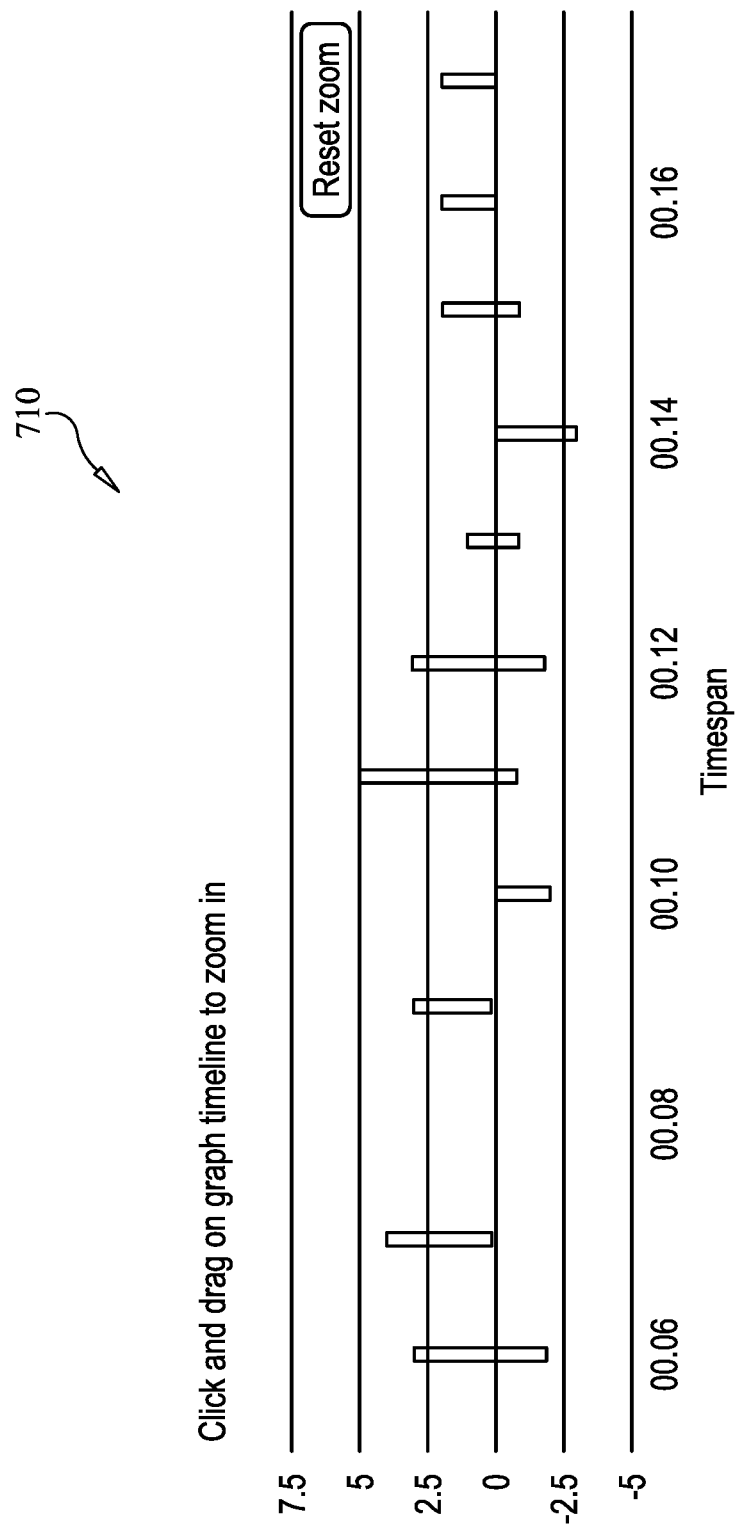

An example of user defined segmentation is provided in FIGS. 7A and 7B. FIGS. 7A provides a page 700 that includes a second reaction graph 701 of likes and dislikes for a presentation as a function of time in minutes 701 and a timeline is segments 715. Reaction graph 701 depicts likes as values that extend upward from the 0 x-axis in one minute intervals along the time span of 00:00 to 00:30. Reaction graph 701 also depicts dislikes as values that extend downward from the 0 x-axis in one minute intervals along the time span of 00:00 to 00:30. Reaction graph 701 also depicts a time span range of interest 710, or defined segment, within the presentation (in this case between 00:06 minutes and 00:17 minutes), which is depicted in FIG. 7B, wherein a zoom in, or magnified view of this time span of interest 710 is provided.

When the time span of interest 710 corresponds to a segment, a user may access information regarding the segment by selecting The timeline of user defined segments 715 indicates segments 720A-720D of the presentation that relate to different content elements of the presentation. For example, segment 720A relates to a introduction segment, segment 720B relates to a 33 dragging out segment, segment 720C relates to a warning a friend segment, and segment 720D relates to a lock car segment. In some instances, segments 720A-720D depicted on the timeline of user defined segments 715 may correspond with a time within the presentation in which content related to these segments is provided to a viewer.

At times, a presentation and/or segment may be associated with one or more viewer comments. A user may access these comments by, for example, selecting a segment from a reaction graph like reaction graphs 600 and/or 700.

Figure 8:
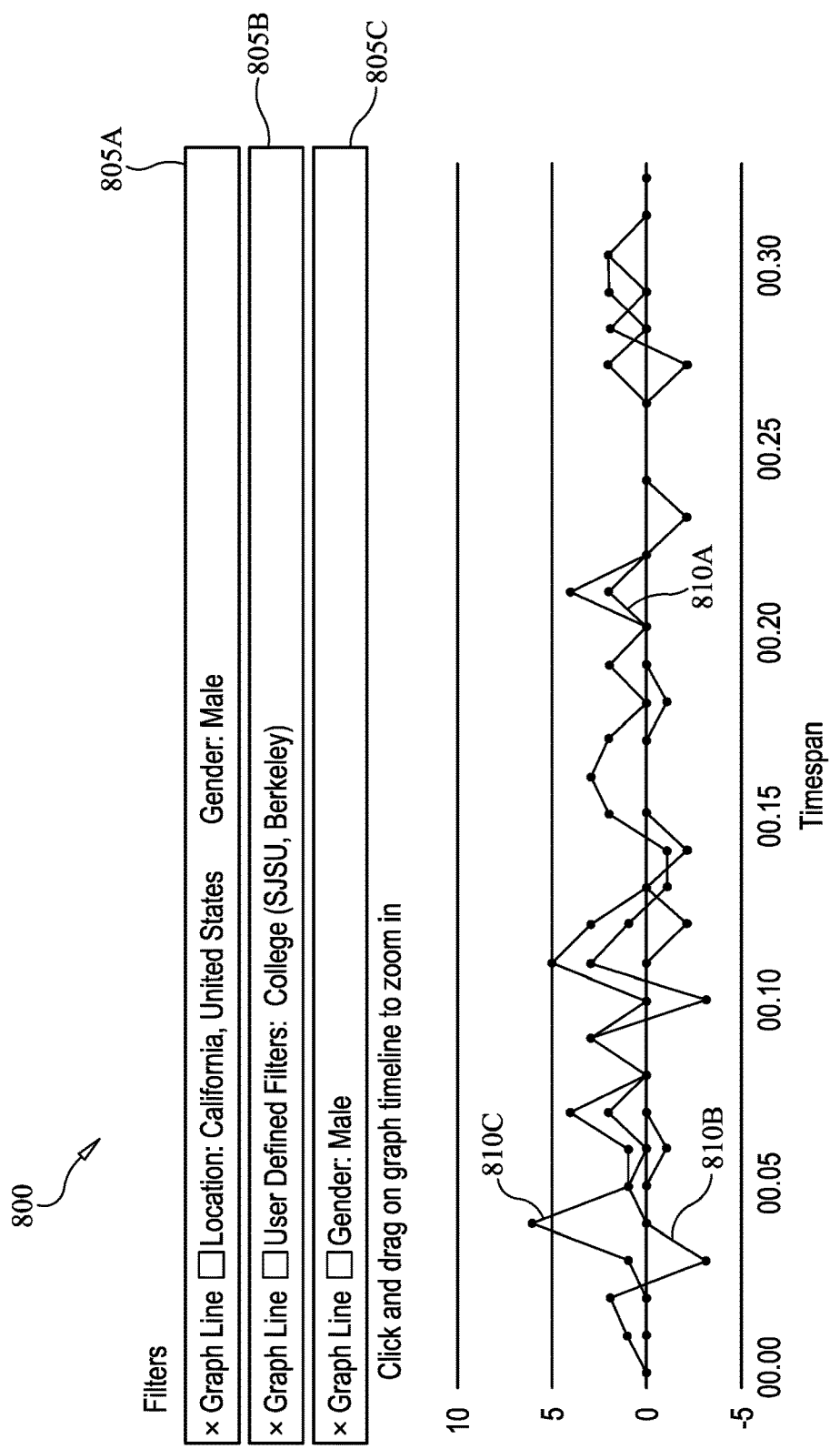

In some instances, a user may apply one or more filters to the viewer information used to make a reaction graph. Exemplary filters may apply to characteristics and/or demographics associated with a viewer (e.g., age, gender, college attended, annual income, etc.), characteristics of the presentation, and when the presentation is viewed. FIG. 8 provides an exemplary filtered reaction graph 800 wherein there are three filters applied to the viewer information as shown in filter indicators 805A, 805B, and 805C. More specifically, filter indicator 805A shows that viewer information has been filtered according to the viewer characteristics of a location being California, in the United States and of the male gender. Data filtered using filter indicator 805A is depicted in reaction graph 800 as line 810A. Filter indicator 805B shows that viewer information has been filtered according to association with the college (SJSU, Berkeley). Data filtered using filter indicator 805B is depicted in reaction graph 800 as line 810B. Filter indicator 805C shows that viewer information has been filtered according to association with the male gender. Data filtered using filter indicator 805C is depicted in reaction graph 800 as line 810C.

Providing reaction graph 800 enables a user to simultaneously view viewer reactions as filtered according to different criteria. This enables a user to, for example, determine how the presentation is being perceived by different types of viewers in order to, for example, determine whether a target audience is having a desired reaction to the presentation and/or a segment thereof.

In another embodiment, a user may be able to compare two different presentations on, for example, one reaction graph or two different reaction graphs that are placed side by side. Viewer information for two different presentations also be provided to the user by table or chart. The viewer information for each of the two presentations 34 may be aligned with one another using, for example, a consistent time scale (i.e., the same intervals of time) and/or segment definition for presenting the viewer information for each respective presentation.

And one embodiment, a user may gain your information by first uploading a presentation to a website accessible by one or more viewers. The user may then select one or more viewers to view the uploaded presentation according to, for example, demographic information and/or knowledge of the particular viewer. For example, a user may upload a presentation and then invite particular individuals to view the presentation and provide feedback. On some occasions, a user may aggregate two or more viewers together into a panel of viewers.

A user may solicit that viewer information by, for example, sending and invitation to an individual viewer, a plurality of individual viewers, and/or a panel of viewers. On some occasions, invitations may be set by email, text (SMS message), or other medium (e.g., phone call). In some instances, viewers may be selected using contacts of the user as would be identified by for example, an address book or a social media platform.

In some instances, viewer information may be used to evaluate a public speaking performance such as a product demonstration, a product/service pitch to a group of investors, a commercial or advertisement, a movie trailer, and so on.

The following discussion relates to an exemplary process for gaining viewer information from a viewer. Initially, a viewer will be surveyed in order to ascertain, for example, viewer demographic information, location information, and awareness or familiarity with subject matter (e.g., brand, product category, individual making the presentation, etc.) associated with the presentation. The viewer may then watch the presentation and provide feedback directly and/or indirectly. Examples of directly provided feedback are viewer comments on the presentation and/or a segment thereof and an indication that the viewer likes or dislikes the presentation and/or a segment thereof. Examples of indirectly provided feedback are viewer attention span as measured by, for example, a frequency of receiving feedback from the viewer and/or eye contact of the viewer on a screen providing the presentation.

On some occasions, the viewer feedback may be compared with the initial 35 survey information to determine, for example, a change in viewer perception and/or a correlation between one or more demographic characteristics and the viewer feedback so as to, for example, determine a trend in perception of the presentation for various demographic characteristics when, for example, analyzing viewer information from a plurality of viewers.

In some instances, a viewer may be surveyed a period of time (e.g., a few hours, a day, a week, etc.) after viewing the presentation in order to gauge, for example, whether the viewer remembers the presentation and/or has a lasting impression of the presentation. The results of this survey may be compared with those of the feedback provided while viewing the presentation in order to, for example, determine any discrepancies therebetween.

We claim:

1. A method comprising:
  receiving a presentation;
  defining a starting and ending point for each of a plurality of segments of the presentation and thereby creating a segmented presentation;
  defining a starting and ending point for each of a plurality of sub-segments of a discrete segment of the plurality of segments;
  providing the segmented presentation, with the discrete segment that includes the plurality of sub-segments, contemporaneously with the feedback mechanism to a plurality of viewers;
  receiving feedback information regarding a discrete sub-segment of the plurality of sub-segments from each of the plurality of viewers via the feedback mechanism; and
  generating a report based on the received feedback information, wherein the report is based on the received feedback information regarding the discrete sub-segment.

2. The method of claim 1, wherein the discrete segment is a first discrete segment, the method further comprising:
  receiving feedback information regarding a second discrete segment of the plurality of segments included in the segmented presentation from each of the plurality of viewers, wherein the report is further based on the received feedback information regarding the second discrete segment.

3. The method of claim 1, further comprising:
  receiving a criterion for defining the starting and ending point for each of the plurality of sub-segments of the discrete segment from a user prior to the defining of the starting and ending point for each of the plurality of sub-segments.

4. The method of claim 1, wherein the feedback information received is either a positive indication or a negative indication, the report comprising a graph that shows the number of positive indications and negative indications for the discrete segment as a function of time.

5. The method of claim 1, further comprising:
  providing a plurality of filters by which a recipient of the report can organize information included in the report to a user;
  receiving a selection of one or more filters from the recipient; and
  filtering the received feedback information using the selected one or more filters, wherein the report is further generated using the filtered feedback.

6. The method of claim 1, further comprising:
  receiving one or more criteria for the plurality of viewers from a user, wherein the segmented presentation is only provided to viewers that match the received one or more criteria.

7. The method of claim 1, wherein the received feedback information includes a viewer comment regarding the discrete segment, the viewer comment being received from at least one of the plurality of viewers via the feedback mechanism.

8. The method of claim 1, wherein the feedback information upon which the report is based includes a viewer comment regarding the discrete segment, the viewer comment being received from at least one of the plurality of viewers via the feedback mechanism.

9. A method comprising:
receiving a presentation;
defining a starting and ending point for each of a plurality of segments of the presentation and thereby creating a segmented presentation;
receiving one or more criteria for the plurality of viewers from a user;
providing the segmented presentation contemporaneously with a feedback mechanism to a plurality of viewers that match the received one or more criteria;
receiving feedback information regarding the presentation from each of the plurality of viewers via the feedback mechanism; and
generating a report for a user based on the received feedback information.

10. The method of claim 9, wherein the feedback information received is either a positive indication or a negative indication, the report comprising a graph that shows the number of positive indications and negative indications for the discrete segment as a function of time.

11. The method of claim 9, further comprising:
providing a plurality of filters by which a recipient of the report can organize information included in the report to a user;
receiving a selection of one or more filters from the recipient; and
filtering the received feedback information using the selected one or more filters, wherein the report is further generated using the filtered feedback.

12. The method of claim 9, further comprising:
receiving one or more criteria for the plurality of viewers from a user, wherein the segmented presentation is only provided to viewers that match the received one or more criteria.

13. The method of claim 9, wherein the received feedback information includes a viewer comment regarding the presentation, the viewer comment being received from at least one of the plurality of viewers via the feedback mechanism.

14. The method of claim 9, wherein the feedback information upon which the report is based includes a viewer comment regarding the presentation, the viewer comment being received from at least one of the plurality of viewers via the feedback mechanism.

* * * * *